UNITED STATES PATENT OFFICE.

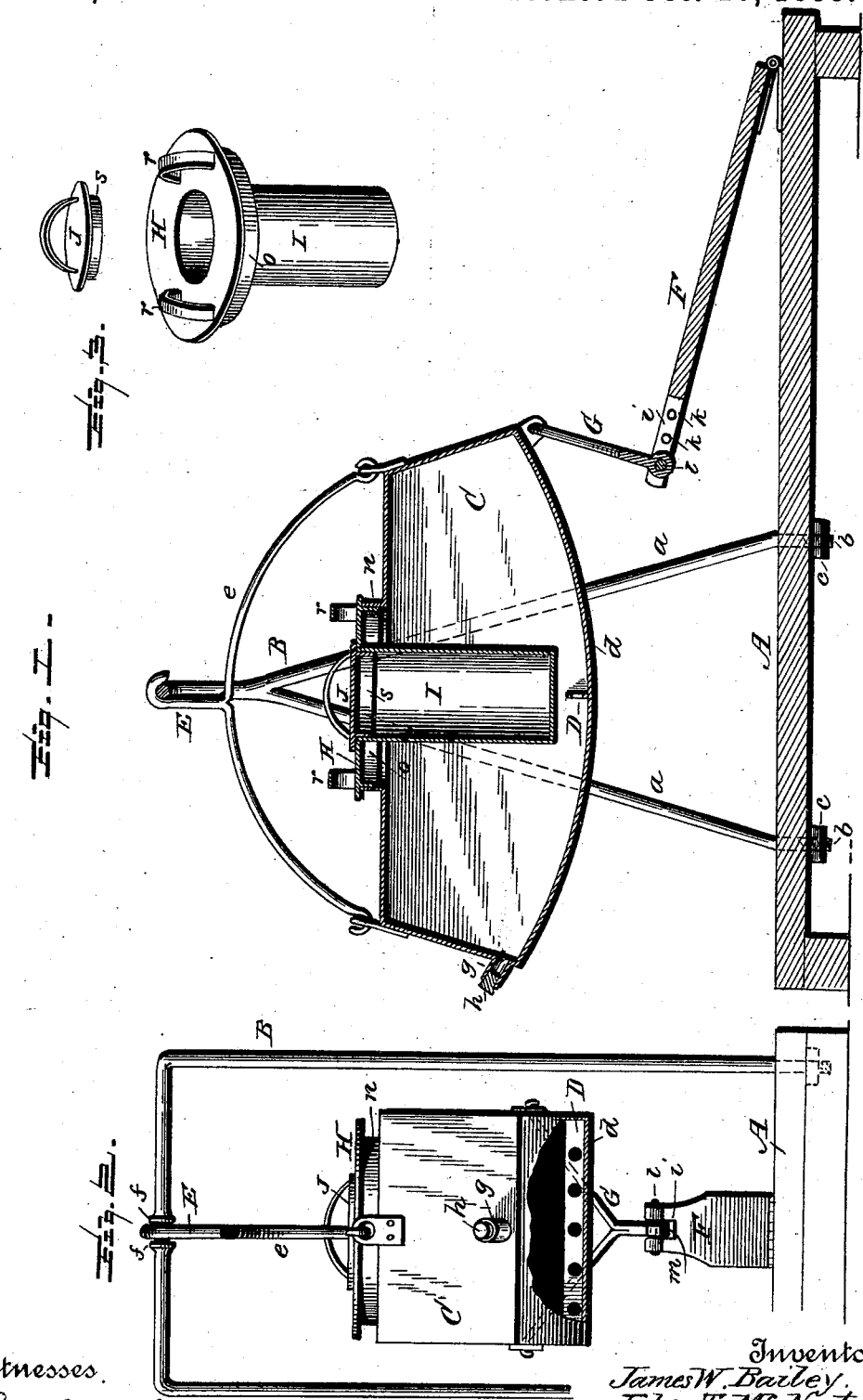

JAMES WESTEY BAILEY AND JOHN TOMAS McNORTON, OF BURNET, TEXAS.

CHURN.

SPECIFICATION forming part of Letters Patent No. 506,300, dated October 10, 1893.

Application filed February 28, 1893. Serial No. 464,133. (No model.)

*To all whom it may concern:*

Be it known that we, JAMES WESTEY BAILEY and JOHN TOMAS MCNORTON, citizens of the United States, residing at Burnet, in the county of Burnet and State of Texas, have invented certain new and useful Improvements in Churns; and we do hereby declare that the following is a full, clear, and exact description of the same, reference being had to the annexed drawings, making a part of this specification, and to the letters of reference marked thereon.

The present invention has relation to that class of churns in which the cream-receptacle or vessel is supported in a stationary frame and a vibratory or swinging motion is given to the vessel through suitable means by which motion the churning of the cream is accomplished.

It is the purpose of the present invention to improve the above mentioned class of churns in the several details of construction, whereby a more perfect separation of the oily globules from the other portion of the cream is obtained, the churning rendered more effective and easy of operation, and the value of the churn materially enhanced.

The several objects above enumerated we attain by the construction substantially as shown in the drawings and hereinafter described and claimed.

Figure 1 of the drawings represents a sectional elevation of a churn constructed in accordance with our invention. Fig. 2 represents an end view showing the cream receptacle or vessel partly broken away. Fig. 3 represents a detail view in perspective of the vessel for containing hot or cold water.

In the accompanying drawings A represents a suitable platform to which is detachably connected a metal frame B for supporting the cream receptacle C hereinafter described. The frame is preferably constructed of a rod of suitable thickness and the sides of the frame are bifurcated to present supports $a$, and the lower extremities of these supports are bent to assume a vertical extension $b$ and are screw threaded to receive nuts $c$ for attaching the frame to the platform and admitting of its being readily detached and removed when found necessary. The frame provides a very simple means for suspending the cream receptacle, the frame possessing lightness as well as strength.

The receptacle C has a curved bottom $d$ and has upon its interior a stationary perforated dasher D which extends transversely thereof.

The receptacle C is provided with a suitable hinged bail $e$ which has a hooked hanger E, which hanger engages with the top of the frame B between shoulders $f$ so as to prevent the hanger from moving laterally upon the frame.

The receptacle C has a spout $g$ provided with a stopper $h$ through which the liquid contents of the receptacle may be drawn off.

To the upper side of the platform A is hinged a suitable treadle F which has its free end slotted as shown at $i$ and a plurality of holes $k$ therein as shown in Fig. 1.

The cream receptacle C is connected with the treadle F through the medium of a bifurcated connection G suitably pivoted to the churn and to the treadle. The point of attachment of the connection G with the treadle can be changed to bring it farther from the end of the treadle, thus rendering the connection adjustable to increase or diminish the leverage power as found desirable. This adjustment is made by removing the pin $l$ and replacing it in any one of the holes $k$ and through the eye $m$ of the bifurcated connection G.

The receptacle C has a suitably sized opening at its top and around which is an upwardly extending flange $n$ to support the head H of a hot or cold water vessel I of sufficient length to extend down into the cream receptacle.

The vessel I is for the purpose of containing hot or cold water for tempering the cream and it is desirable that the vessel should extend some distance down into the receptacle C so that the cream when in motion will be brought against the sides of the vessel. It is further desirable that a tight joint should be made around the opening in the receptacle, and the opening being necessarily large to obtain access to the interior for cleaning or for removing the butter, in order to close the opening and provide a cover therefor, the vessel is provided with the head H hereinbefore described which fits over the opening and closes it. This head is provided with a downwardly projecting flange o which snugly fits against the flange n and thus forms a close and tight joint. The head H has suitable handles r for lifting the vessel I out of the cream receptacle C, and said vessel is provided with a suitable cover J which is also provided with a downwardly projecting flange s to fit tightly against the interior of the vessel.

A vibratory or swinging motion is given to the cream receptacle by means of the treadle and its connections, thus giving the required agitation to the cream necessary to separate the oily globules from the other portions and produce butter.

Many changes or modification could be made in the details of construction without affecting the successful operation of the churn, and we therefore reserve the right to make any such changes as would come within ordinary mechanical skill without departing from the principle of our invention.

Having now fully described our invention, what we claim as new, and desire to secure by Letters Patent, is—

In a churn, a suitable platform a frame constructed of a single piece of metal and detachably connected thereto, said frame having its sides bifurcated to present flaring supporting arms, and their lower extremities bent to assume vertical extensions which are screw threaded, and nuts engaging therewith, the upper portion of the frame having a transverse support having shoulders thereon, in combination with a suitable churn-cylinder and a bail connected thereto and provided with a hooked hanger to engage the transverse support of the frame between the shoulders thereof, substantially as and for the purpose set forth.

In testimony that we claim the above we have hereunto subscribed our names in the presence of two witnesses.

JAMES WESTEY BAILEY.
JOHN TOMAS McNORTON.

Witnesses:
E. L. BULLARD,
A. B. JOHNSON.